United States Patent
Grodt et al.

(10) Patent No.: US 10,584,961 B2
(45) Date of Patent: Mar. 10, 2020

(54) EDGE PROFILE DETECTION

(71) Applicant: Seagate Technology LLC, Cupertino, CA (US)

(72) Inventors: Travis William Grodt, Fremont, CA (US); Stephen Christopher Kekoa Hager, Novato, CA (US); Henry Luis Lott, Fremont, CA (US); David Marcus Tung, Livermore, CA (US); Joachim Walter Ahner, Livermore, CA (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/834,010

(22) Filed: Dec. 6, 2017

(65) Prior Publication Data

US 2019/0128664 A1 May 2, 2019

Related U.S. Application Data

(60) Provisional application No. 62/577,667, filed on Oct. 26, 2017.

(51) Int. Cl.
| | |
|---|---|
| *G01B 11/24* | (2006.01) |
| *G06T 7/50* | (2017.01) |
| *G06T 7/10* | (2017.01) |

(52) U.S. Cl.
CPC ............ *G01B 11/2433* (2013.01); *G06T 7/10* (2017.01); *G06T 7/50* (2017.01)

(58) Field of Classification Search
None
See application file for complete search history.

(56) References Cited

U.S. PATENT DOCUMENTS

| | | | | |
|---|---|---|---|---|
| 4,291,978 | A * | 9/1981 | Seigel | E21B 47/022 175/45 |
| 6,633,383 | B1 * | 10/2003 | Jackson | B65H 63/006 356/238.2 |
| 7,495,248 | B2 | 2/2009 | Mitsui et al. | |
| 8,280,172 | B1 | 10/2012 | Campbell et al. | |
| 9,127,938 | B2 | 9/2015 | Adelson et al. | |
| 9,538,056 | B2 | 1/2017 | Adelson et al. | |
| 9,600,911 | B2 | 3/2017 | Wang et al. | |
| 2006/0133244 | A1 * | 6/2006 | Tagiri | G11B 7/24038 369/53.1 |
| 2011/0304482 | A1 * | 12/2011 | Kapner | G01D 5/24476 341/13 |
| 2013/0033595 | A1 * | 2/2013 | Adelson | A61B 5/0077 348/92 |
| 2018/0158183 | A1 * | 6/2018 | Kobayashi | G01N 21/84 |

* cited by examiner

*Primary Examiner* — Talha M Nawaz
(74) *Attorney, Agent, or Firm* — Holzer Paterl Drennan

(57) ABSTRACT

A system includes a light source, a detector, and a processor. The light source is configured to emit light onto a target. The detector is configured to receive light interaction between the emitted light and the target. The processor is configured to receive the light interaction between the emitted light and the target and further configured to process the light interaction to determine an edge profile associated with the target.

22 Claims, 6 Drawing Sheets

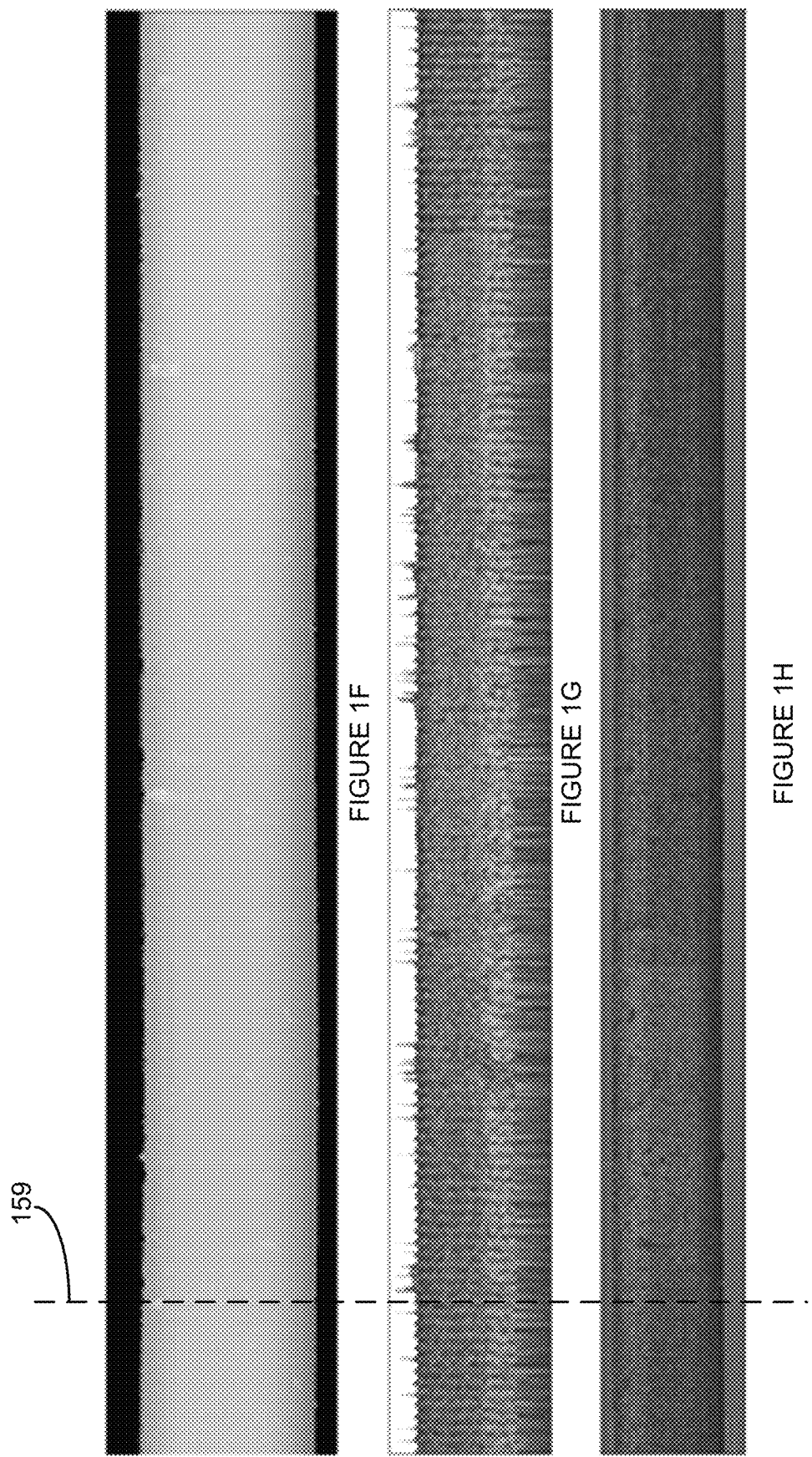

X-Direction Cross Section of Target

EDGE PROFILE DETECTION

RELATED

This application claims the benefit and priority to the U.S. Provisional Patent Application No. 62/577,667, filed on Oct. 26, 2017, which is hereby incorporated by reference in its entirety.

SUMMARY

Provided herein is a system including a light source, a detector, and a processor. The light source is configured to emit light onto a target. The detector is configured to receive light interaction between the emitted light and the target. The processor is configured to receive the light interaction between the emitted light and the target and further configured to process the light interaction to determine an edge profile associated with the target. These and other features and advantages will be apparent from a reading of the following detailed description.

BRIEF DESCRIPTION OF DRAWINGS

FIGS. 1A-1H show an exemplary edge profile detection system and simulation results therefrom according to one aspect of the present embodiments.

DESCRIPTION

Figure 1A:
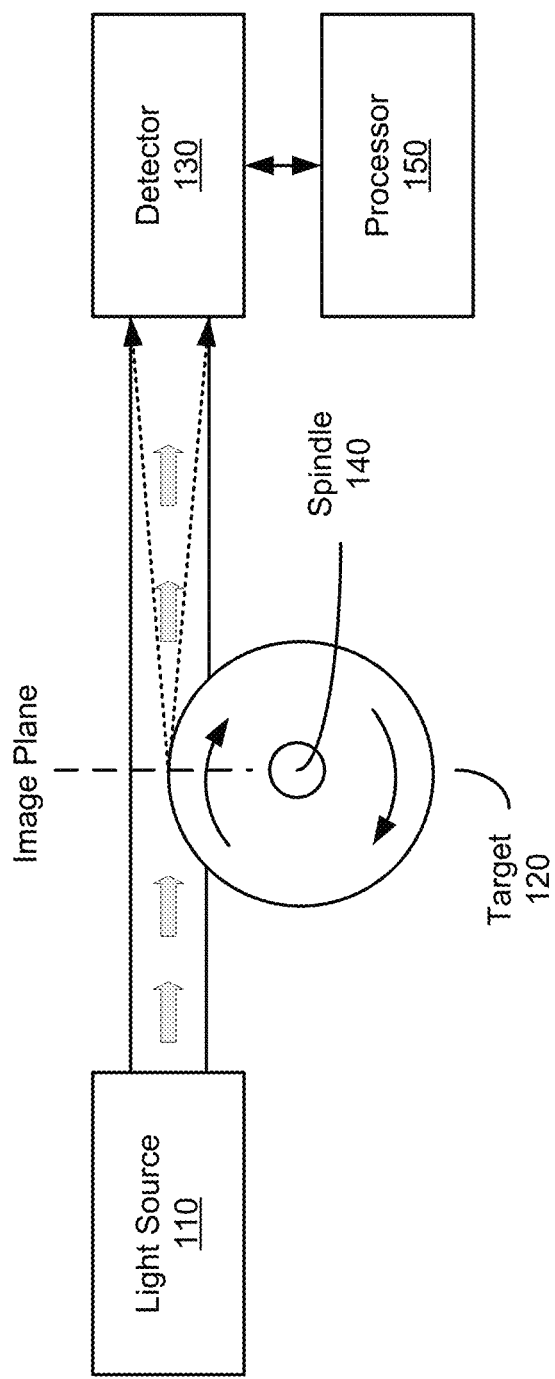

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "middle," "bottom," "beside," "forward," "reverse," "overlying," "underlying," "up," "down," or other similar terms such as "upper," "lower," "above," "below," "under," "between," "over," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Prevalence of technology such as smartphones, hard drives, etc., has increased the need to cut material such as glass with stringent form factor requirements. For example, glass may be cut based on stringent form factors to provide touch screen capabilities for smartphones. Similarly, newer hard drive technology may use glass as a substrate, and such glass cut with stringent form factors.

With respect to the hard drive industry, deployment of Heat Assisted Magnetic Recording (HAMR) technology includes a substrate material change to glass consistent with thermal transfer properties of the HAMR writing process. In addition, the more mature Perpendicular Media Recording (PMR) based magnetic storage can benefit using glass given the modulus and the density being very similar to aluminum used in most of the cloud storage products currently. By adopting glass media, a thinner substrate can be used, therefore allowing the disk packing density to be increased resulting in a larger capacity drive.

Although for certain smartphone applications, re-cutting a sheet of glass to the round disk shape used in today's hard drives would suffice. Unfortunately though, the touchscreen technology for smartphones as well as the hard drive technology are moving toward form factors and requirements, e.g., the principal surface, dimension metrics, roughness, etc., that are difficult to meet using mechanical cutting. New techniques can be used to address the stringent form factors with respect to dimensions, roughness, etc. For example, a U.S. patent application Ser. No. 15/702,619, filed on Sep. 12, 2017, entitled "Laser Beam Cutting/Shaping A Glass Substrate", a U.S. patent application Ser. No. 15/729,042, filed on Oct. 10, 2017, entitled "Shaping A Glass Substrate After Cutting", and a U.S. patent application Ser. No. 15/792,279, filed on Oct. 24, 2017, entitled "Edge Polishing A Glass Substrate After Cutting" discuss various methods to cut and shape the glass, and are incorporated herein by reference in their entirety.

Accordingly, a desire has now arisen to detect the edge profile of the glass after it is cut in order to determine whether it meets the required dimensions, roughness, etc. Embodiments described herein leverage a new contrast based metrology to accurately determine edge symmetry, dimensional deviations and vibration signatures. It is appreciated that although the embodiments described in the subsequent figures are described with respect to determining edge symmetry, dimensional deviations and vibration signatures of disks in hard drive, the system may be used for non-hard drive applications as well, e.g., touchscreen, etc. As such, any discussion of the embodiments with respect to hard drive disks is for illustration purposes and should not be construed as limiting the scope of the embodiments.

In some embodiments, a system includes a light source, a detector, and a processor. The light source is configured to emit light onto a target. The detector is configured to receive light interaction between the emitted light and the target. The processor is configured to receive the light interaction between the emitted light and the target and further configured to process the light interaction to determine an edge profile associated with the target.

Referring now to FIGS. 1A-1H, an exemplary edge profile detection system and simulation results therefrom according to one aspect of the present embodiments is shown. Referring specifically to FIG. 1A, a system for detecting edge profile of a glass according to one aspect of the embodiments is shown. The system includes a light source 110, a spindle 140, a detector 130, and a processor 150. It is appreciated that the spindle 140 may be configured to mount a target 120, e.g., a disk, glass, etc. thereon and rotate.

In some embodiments, the light source 110 is configured to emit light onto the target 120 being held and/or rotated by the spindle 140. Emitted light from the light source 110 interacts with the target 120. Light from the light source 110 and/or light interaction with the target 120 is received by the detector 130. The detector 130 provides data associated with the received light, e.g., light from the light source 110 and/or light interaction with the target 120, to the processor 150 for processing. The processor 150 processes the received data and determines the necessary edge fidelity and resolution that corresponds to the edge profile geometries of the target 120.

More specifically, the light source 110 is configured to emit light to the periphery, e.g., edges, outer diameter, etc. of the target 120. The light source 110 may be a laser source, a collimated light source, a light emitting diode (LED) source, a monochromatic light source, achromatic light source, etc. In some embodiments, the light source 110 emits light that is coherent light. However, it is appreciated that non-coherent light may be used and an error correction circuitry may be used to compensate for errors associated with use of non-coherent light. In some embodiments, the light emitted from the light source 110 may have a narrow illumination angle. The light emitted from the light source 110 interacts with the target 120, e.g., light interacts with the edges of the target 120. The light interaction may include light reflection, light refraction, light diffraction, etc. resulting from interaction with the target 120. In some embodiments, the light emitted from the light source 110 may interact with the edges of the target 120 and as a result changes optical characteristic of the light, e.g., wavelength may be change, polarization may be changed, etc. It is appreciated that some of the light emitted from the light source 110 may not interact directly with the edges or inner part of the target 120.

The target 120 is mounted on the spindle 140 and the spindle 140 rotates. In some embodiments, the spindle rotates at a constant speed and as it rotates the detector 130 captures the light received from the target 120. In some embodiments, the target 120 is mounted on the spindle 140 such that target 120 is positioned parallel to optical axis of the light emitted from the light source 110. In other words, the target 120 may be positioned and held by the spindle 140 such that the light emitted from the light source 110 is tangential to the edges of the target 120 in order to provide an edge on view of the tangential portion of the target 120 thickness. It is, however, appreciated that in some embodiments, a different configuration may be used.

The light emitted from the light source 110 whether interacting with the target 120 directly or not is received by the detector 130. In some embodiments, the detector 130 receives the light from the light source 110 and/or from the light interacting with the target 120. The target 120 may cast a shadow on the detector 130. The detector 130 may capture light contrast between the casted shadow to a portion that does not include the shadow. As such, the data captured by the detector 130 once processed by the processor 150 provides the necessary edge fidelity and resolution corresponding to the edge profile geometries. It is appreciated that in some embodiments, the detector 130 may include a CMOS, a Charge-Coupled Device (CCD) camera, etc. In other words as light, e.g., collimated light, is illuminated to the target 120, e.g., disk edge, a mask or shadow is formed on the detector 130, e.g., CCD camera, CMOS, etc. The image possesses useful characteristic of high contrast from the target 120, e.g., disk edge, masking or blocking a portion of the light, e.g., collimated light.

The processor 150, e.g., a computer, Application Specific Integrated Circuit (ASIC), Field Programmable Gate Array (FPGA), a central processing unit (CPU), etc., receives the captured data by the detector 130. In some embodiments, the processor 150 may utilize image processing to determine an edge profile associated with the target. For example, the processor 150 may determine edge symmetry, dimensional deviations and vibration signatures associated with the edge profile of the target 120. In some embodiments, the processor 150 is configured to use light gradient to determine the edge profile associated with the target 120. Light gradient may be a vector of steepest ascent or descent of light contrast. Light gradient may be defined as $$\nabla f = \left[\frac{\partial f}{\partial x}, \frac{\partial f}{\partial y}\right].$$

The light gradient due to mask/contrast imaging provides the necessary edge fidelity and resolution for tracking edge profile geometries. Enhancement of edge resolution below the diffraction limit of light is achieved by light scattering and diffraction of light at the edge. In some embodiments, the edge profile may be derived by computing a 2D derivative, also known as the gradient. In this embodiment, a convolutional kernel may be employed that combines the gradient calculation with filtering.

It is appreciated that the methodology described above may be performed for each captured image. In some embodiments, one image is captured for a small rotation angle until the target 120, e.g., disk, sample completes a full revolution. Sample resolution may be controlled by the number of images taken per 360 degrees of rotation. In some embodiments, 5000 or so images provide circumferential accuracy exceeding 1 milli-Radian (mR). It is appreciated that additional resolution can be achieved by increasing the number of images captured per revolution. For example, 20000 images provides circumferential resolutions better than 250 uR or 12 um for a 47 mm radius disk. Given the number of captured images, the processing may be performed in near real-time.

Figure 1B:
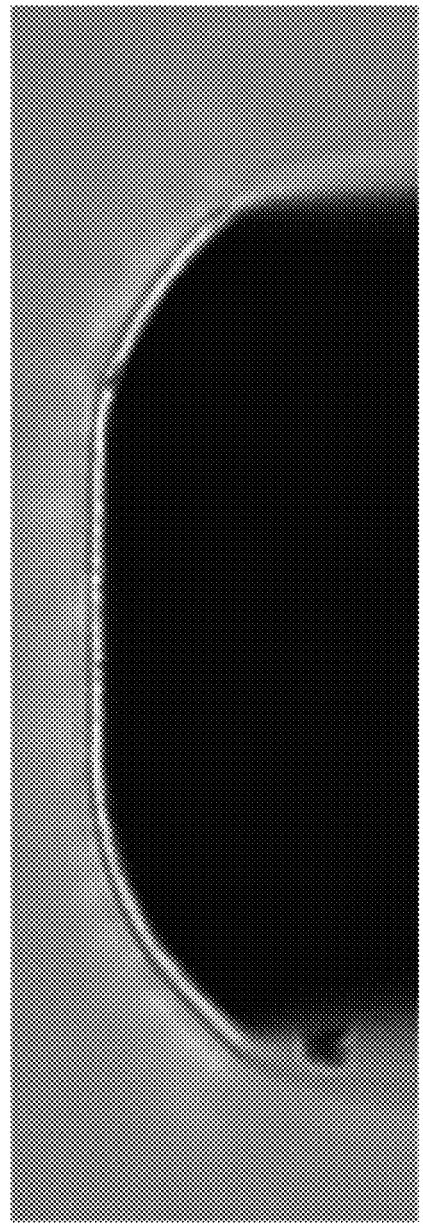
Figure 1C:
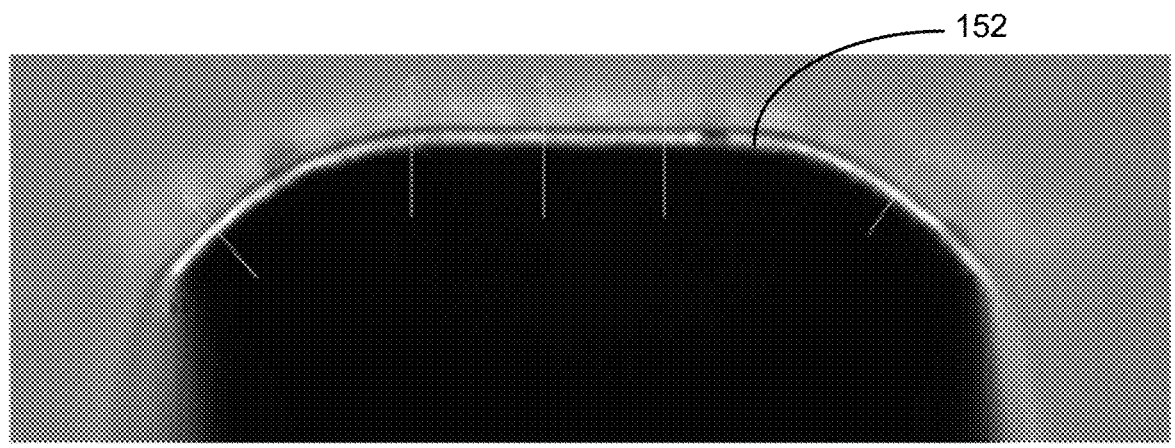
Figure 1D:
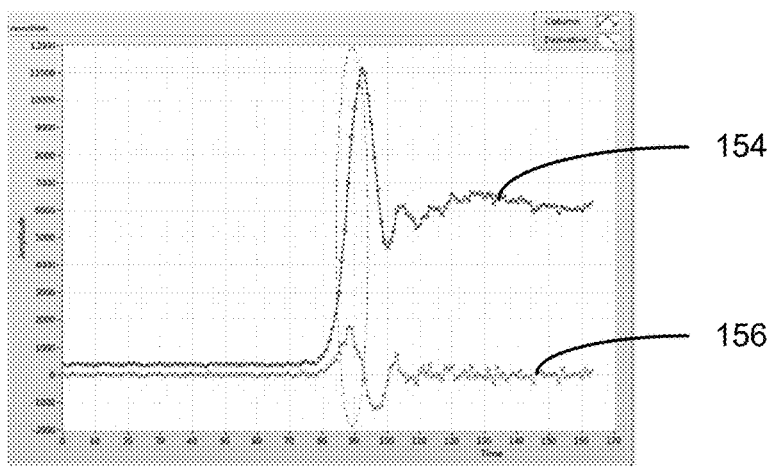

Referring now to FIG. 1B, an exemplary image captured by detector 130 is shown. The captured image illustrates the shadow cast by the target 120. Referring now to FIG. 1C, an edge profile 152 as determined by the processor 150 is shown. It is appreciated that the arrows illustrate the light gradient from the inner diameter of the target 120 toward its periphery and outer diameter. Referring now to FIG. 1D, a determination of the light profile 154, by the processor 150, from inner diameter of the target 120 to the outer diameter of the target 120 is shown. Furthermore, derivative light profile 156, as determined by the processor 150, is shown. The derivative light profile 156 illustrates the derivate light profile from the inner diameter of the target 120 to the outer diameter of the target 120. It is noteworthy that the ringing, as illustrated, may be due to edge interferences of the light, e.g., collimated light, etc.

Figure 1E:
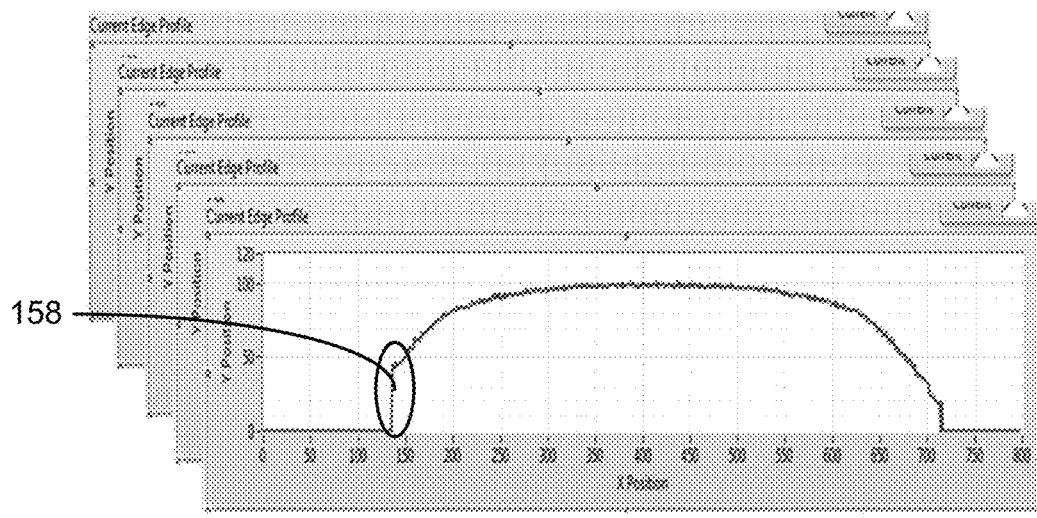

Referring now to FIG. 1E, analysis for each captured image is shown. It is appreciated that the sharpest increase/decrease 158 in contrast may correspond to the edge boundary of the target 120. Each image is processed to determine the point corresponding to the edge boundary of the target 120. Once every captured image is processed for the full revolution of the target 120, the points may be connected to form the edge profile associated with the target 120.

Referring now to FIGS. 1F-1H, a different illustration of the light gradient (light contrast) is shown. It is appreciated that line 159, for each of the FIGS. 1F-1H, corresponds to light contrast going from the inner diameter of the target 120, e.g., disk, toward its outer diameter. A top down view reveals geometric anomalies from the intended edge profile.

Figure 2:
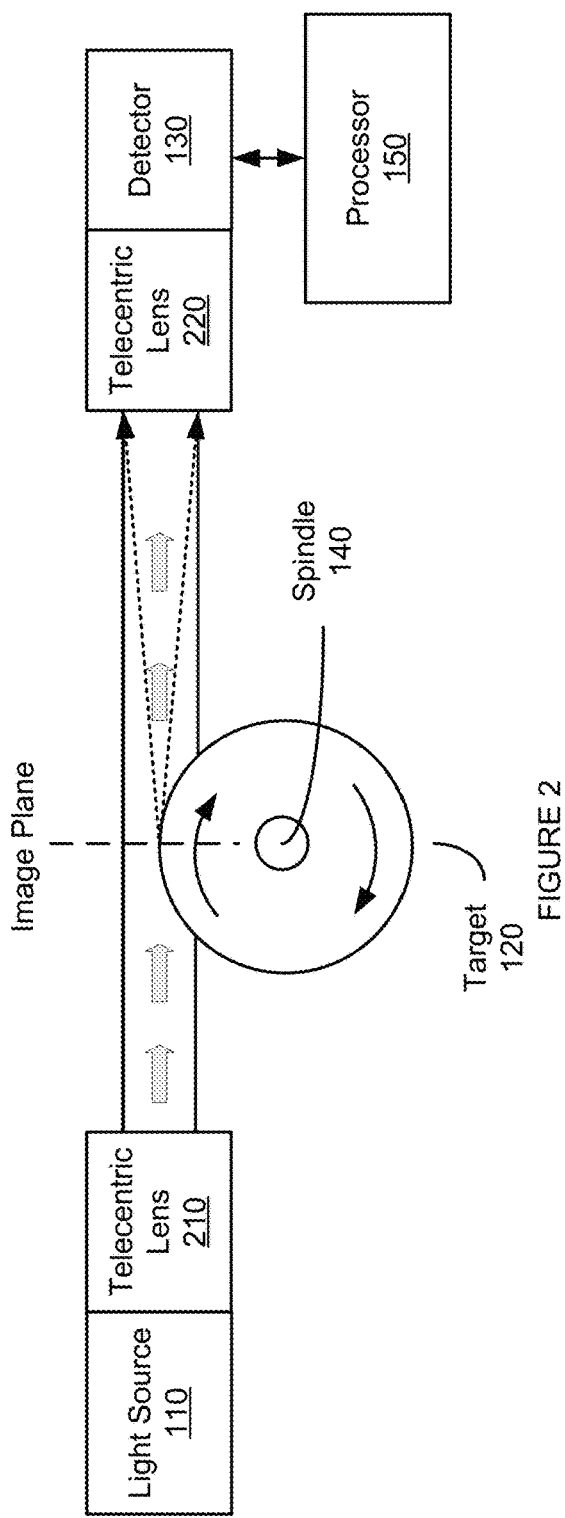
FIG. 2 shows another exemplary edge profile detection system according to one aspect of the present embodiments.

Referring now to FIG. 2, another exemplary edge profile detection system according to one aspect of the present embodiments is shown. FIG. 2 is substantially similar to that of FIG. 1A. In this embodiment, a telecentric lens 210 is coupled to the light source 110 and a telecentric lens 220 is coupled to the detector 130. It is appreciated that although two telecentric lenses are used, in some embodiments only one telecentric lens may be used. For example, in some embodiments, the telecentric lens 210 may be used without using the telecentric lens 220 and vice versa. It is appreciated that the telecentric lens 210 may be used to enhance light collimation and to further improve light source uniformity. It is further appreciated that the telecentric lens 220 may be used to enhance accuracy and improve angle of detection.

Figure 3B:
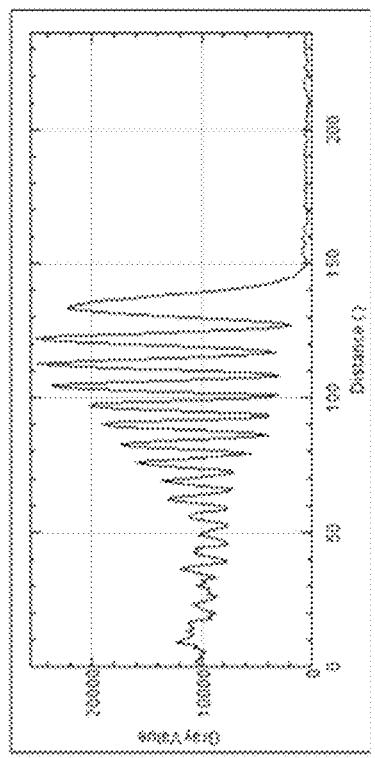
FIGS. 3A-3B shows an interference pattern for determining edge profile using monochromatic light source according to one aspect of the present embodiments.
Figure 3A:
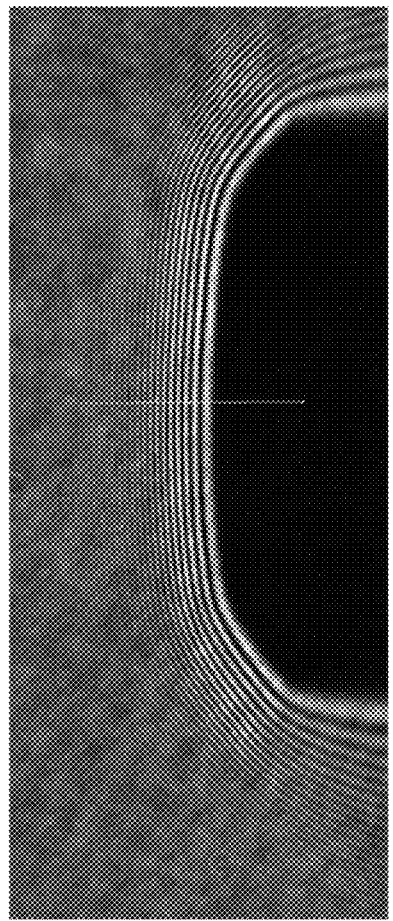

Referring now to FIGS. 3A-3B, an interference pattern for determining edge profile using monochromatic light source according to one aspect of the present embodiments is shown. The interference pattern shown is based on the system as described in FIG. 1A where a monochromatic light source 110 is used. It is appreciated that in some embodiments, the monochromatic light source (expanded laser beam) enhances interference patterns that are observed, as shown in FIG. 3A. Referring now to FIG. 3B, the light intensity on the y-axis is shown. The light intensity for points on the target 120 are shown on the x-axis moving from the inner diameter of the target 120 toward its outer diameter 120 and beyond.

Figure 4:
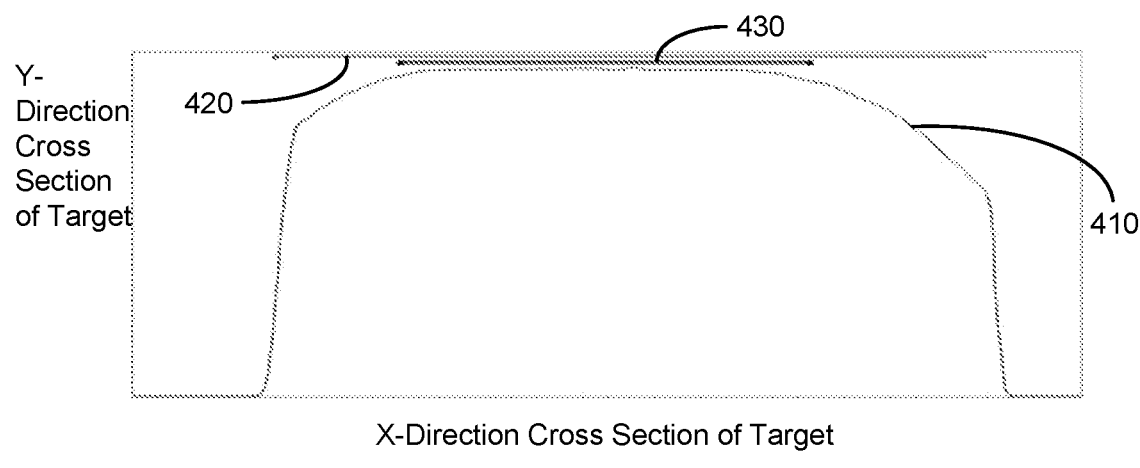
FIG. 4 shows an exemplary edge profile for a disk using gradient derivative processing according to one aspect of the present embodiments.

Referring now to FIG. 4, an exemplary edge profile for a disk using gradient derivative processing according to one aspect of the present embodiments is shown. The average and/or median 410 for the light contrast for each captured point is illustrated. As illustrated, symmetry and/or curvature anomalies may be identified, as shown by the average and/or median 410 for the light contrast for the target 120. The average and/or median 410 may represent the edge profile of the target 120. Furthermore, the thickness 420 for the edge profile of the target 120 may be rendered. For example, the thickness 420 may represent the surface of the target 120. The wall 430 profile of the target 120 may also be rendered and may be calculated using the average and/or median 410. It is appreciated that other metrics of interest for the edge profile symmetry may similarly be calculated and rendered.

Figure 5:
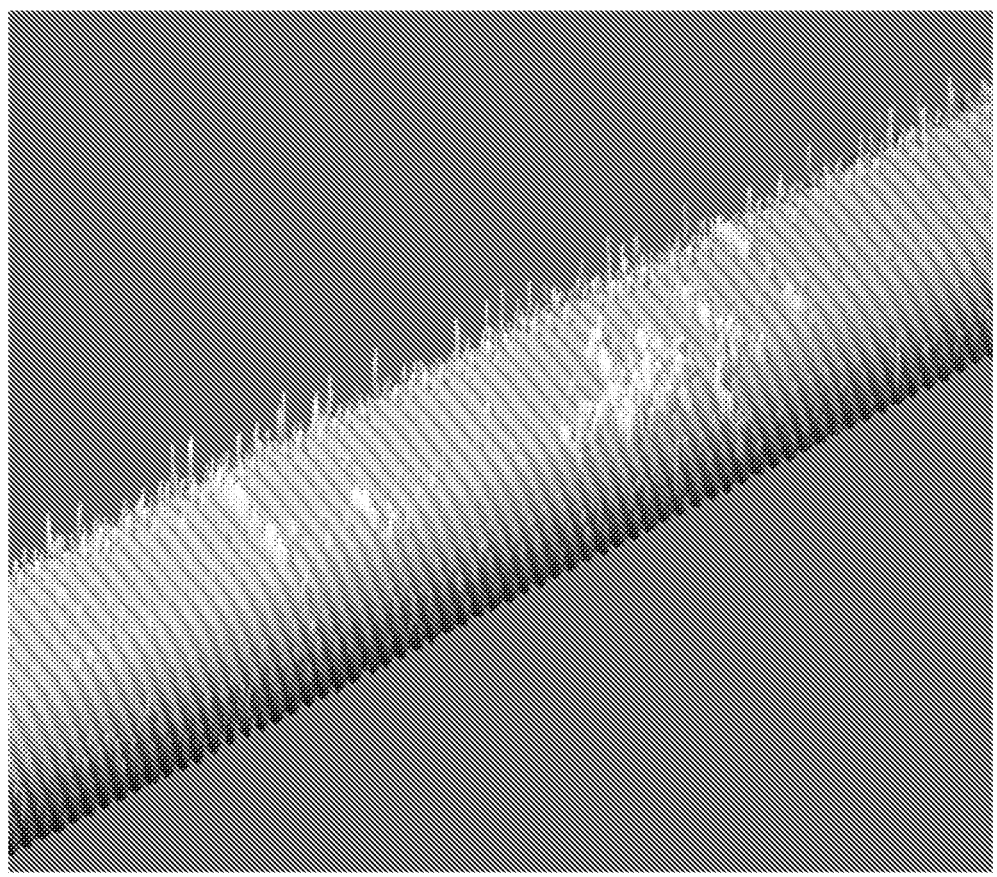
FIG. 5 shows a 3-D rendition of the edge profile according to one aspect of the present embodiments.

Referring now to FIG. 5, a 3-D rendition of the edge profile according to one aspect of the present embodiments is shown. It is appreciated that the captured images with the appropriate edge trajectory determined by the methods described above may be used to form a continuous 3D edge profile. It is appreciated that the illustrated perspective view provides height and deformation information associated with the target 120 edge profile. The 3-D image may be rendered on a display device (not shown). Thus, edge features and defects associated with the target 120 may be inspected and analyzed.

Figure 6:
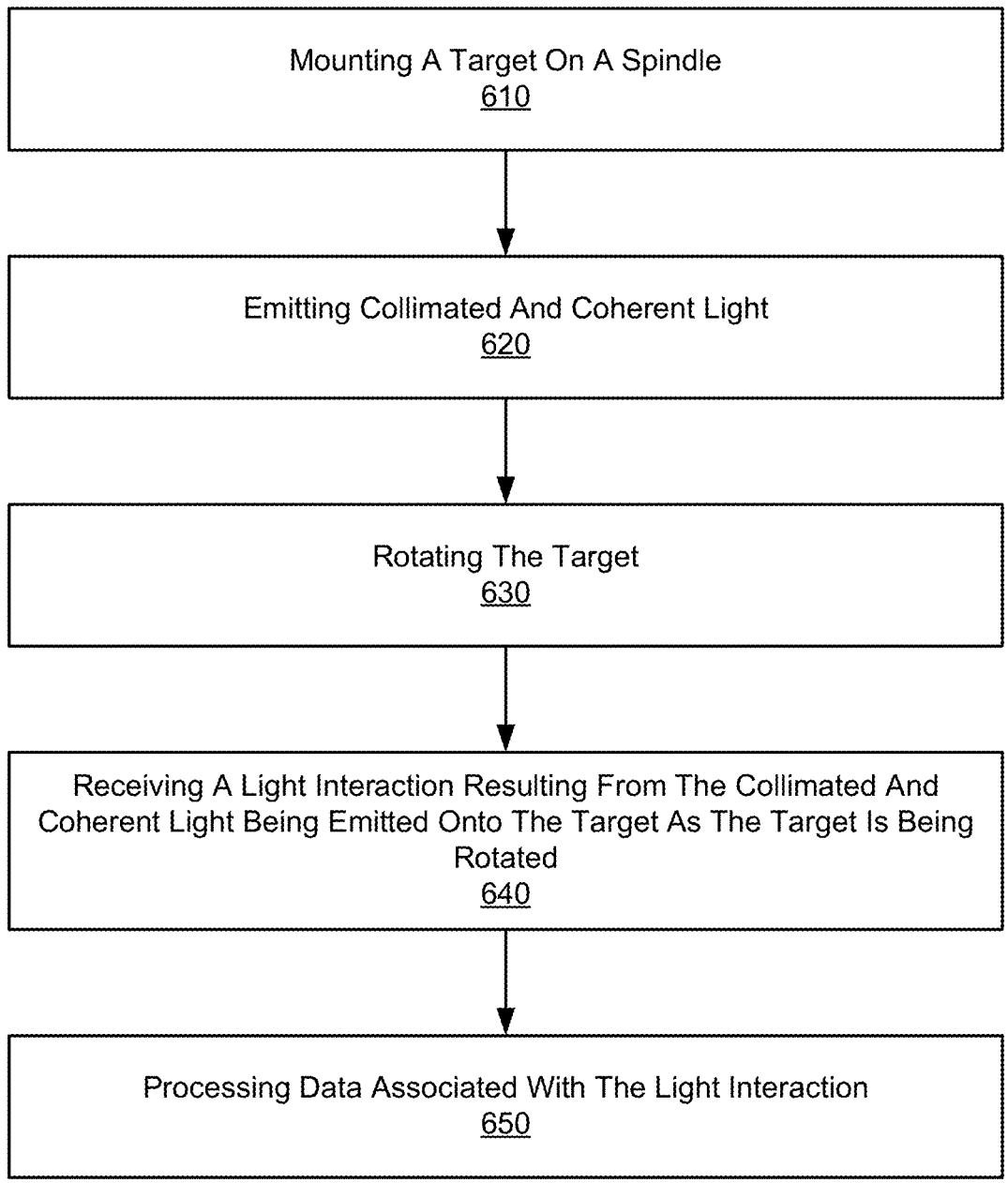
FIG. 6 shows a flow diagram for detecting edge profile according to an alternate aspect of the present embodiments.

Referring now to FIG. 6, a flow diagram for detecting edge profile according to an alternate aspect of the present embodiments is shown. At step 610, the target, e.g., target 120, is mounted on a spindle, e.g., spindle 140. It is appreciated that the target may be mounted on the spindle parallel to optical axis of the emitted collimated and coherent light. At step 620, collimated and coherent light may be emitted from a light source, e.g., light source 110, onto the target. At step 630, the target may be rotated, e.g., using the spindle 140. It is appreciated that the spindle may rotate the target at a constant speed.

At step 640, the light emitted from the light source interacts with the target, e.g., edges of the target as described in FIGS. 1A-5, and it is received, e.g., by a detector 130. The light interaction may include light reflection, light diffraction, light refraction from the target, or any combination thereof. The light interaction is the result of the collimated and coherent light being emitted onto the target as the target is being rotated by the spindle. Light interaction includes a shadow resulting from the collimated and coherent light being emitted onto the target. At step 650, data associated with the light interaction and the shadow is processed and used to determine an edge profile associated with the target. For example, a light gradient may be applied in order to determine the edge profile of the target. It is appreciated that the edge profile may include edge symmetry, dimensional deviations, thickness, and vibration signatures associated with the edge profile of the target. In some embodiments, the processed information associated with the edge profile may be rendered on a display. For example, a 3-dimensional profile of the edge profile may be rendered on a display.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear to persons having ordinary skill in the art to which the embodiments pertain, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A system comprising:
    a collimated light source configured to emit coherent light onto a target;
    a spindle configured to mount the target parallel to optical axis of the emitted coherent light, and wherein the spindle is configured to rotate the target;
    a detector configured to receive light interaction between the emitted coherent light and the target as the spindle rotates the target, wherein the emitted coherent light interacting with the target casts a shadow on the detector; and
    a processor configured to:
        receive data associated with the light interaction between the emitted light and the target;

determine an edge profile of the target based on a determined light gradient of the data, the light gradient being a vector of ascent or descent of light contrast; and present data associated with the edge profile to a display.

2. The system of claim 1, wherein the target comprises glass and wherein the light interaction comprises light reflection, light diffraction, and light refraction from the target.

3. The system of claim 1, wherein the collimated light source is a laser source.

4. The system of claim 1, wherein the detector is selected from a group consisting of a CMOS and a CCD camera.

5. The system of claim 1, wherein the edge profile includes edge symmetry, dimensional deviations and vibration signatures associated with the edge profile of the target.

6. The system of claim 1, wherein the processor is configured to use light gradient to determine the edge profile associated with the target.

7. The system of claim 1, wherein the processor is further configured to render a 3-dimensional profile of the edge profile on the display.

8. A system comprising:
a light source configured to emit light onto a target;
a detector configured to receive light interaction between the emitted light and the target; and
a processor configured to receive data associated with the light interaction between the emitted light and the target and further configured to process the data associated with the light interaction to determine an edge profile of the target based on a determined light gradient of the data, the light gradient being a vector of ascent or descent of light contrast; and
present data associated with the edge profile on a display.

9. The system of claim 8, wherein the target comprises glass and wherein the light interaction comprises light reflection, light diffraction, and light refraction from the target.

10. The system of claim 8, wherein the light source is configured to emit coherent light.

11. The system of claim 8, wherein the light source is selected from a group consisting of a laser source and a collimated light source.

12. The system of claim 8, wherein the detector is selected from a group consisting of a CMOS and a CCD camera.

13. The system of claim 8, wherein the light source is configured to emit light tangential to edges of the target.

14. The system of claim 8, wherein the processor is configured to use light gradient to determine the edge profile associated with the target.

15. The system of claim 8 further comprising a spindle configured to mount the target, wherein the spindle is further configured to rotate the target at a constant speed.

16. The system of claim 8, wherein the processor is further configured to render a 3-dimensional profile of the edge profile on the display.

17. The system of claim 8 further comprising a telecentric lens positioned and coupled to the light source, and wherein the system further comprises another telecentric lens positioned and coupled to the detector.

18. A method comprising:
mounting a target on a spindle parallel to optical axis of the emitted collimated and coherent light;
emitting collimated and coherent light onto the target;
rotating the target as the collimated and coherent light is emitted onto the target;
receiving a light interaction resulting from the collimated and coherent light being emitted onto the target as the target is being rotated, wherein the light interaction includes a shadow resulting from the collimated and coherent light being emitted onto the target; and
processing data associated with the light interaction and the shadow to determine a light gradient defining a vector of ascent or descent of light contrast;
determining an edge profile of the target based on the light gradient; and
presenting data associated with the edge profile on a display.

19. The method of claim 18, wherein the light interaction comprises light reflection, light diffraction, and light refraction from the target.

20. The method of claim 18, wherein the processing includes applying a light gradient.

21. The method of claim 18, wherein the edge profile includes edge symmetry, dimensional deviations and vibration signatures associated with the edge profile of the target.

22. The method of claim 18 further comprising rendering a 3-dimensional profile of the edge profile.

* * * * *